United States Patent [19]

Hummel

[11] 4,016,520
[45] Apr. 5, 1977

[54] THERMOSTAT AND ANTICIPATOR THEREFOR AND METHODS OF OPERATING AND MAKING SUCH

[75] Inventor: Wiley M. Hummel, Morrison, Ill.

[73] Assignee: General Electric Company, Fort Wayne, Ind.

[22] Filed: Nov. 4, 1974

[21] Appl. No.: 520,894

[52] U.S. Cl. .............................. 337/100; 337/107
[51] Int. Cl.² ........................................ H01H 61/02
[58] Field of Search .......... 236/68 B; 219/504, 505, 219/511; 337/100, 102, 107, 377; 320/35, 36; 317/41

[56] References Cited

UNITED STATES PATENTS

| | | | |
|---|---|---|---|
| 2,156,082 | 4/1939 | Crago | 236/68 |
| 2,628,034 | 2/1953 | Ray | 236/68 |
| 2,870,965 | 1/1959 | Kreuter | 236/68 |
| 3,050,865 | 8/1962 | Morey | 236/68 B X |
| 3,309,019 | 3/1967 | Nelson | 236/68 |
| 3,525,914 | 8/1970 | Vind | 337/107 X |
| 3,538,310 | 11/1970 | Moyer et al. | 219/511 |
| 3,573,698 | 4/1971 | Mitick | 337/103 |
| 3,680,023 | 7/1972 | Kautz | 337/107 |
| 3,817,453 | 1/1973 | Pinckaers | 236/68 |

*Primary Examiner*—William H. Beha, Jr.
*Assistant Examiner*—Fred E. Bell
*Attorney, Agent, or Firm*—Joseph E. Papin

[57] ABSTRACT

An anticipator for controlling the cycle rate and the drop of a thermostat. The anticipator has means for transferring heat supplied thereto, and means enclosed within the heat transferring means, in preselected space relation therewith for supplying the heat.

There is also disclosed a thermostat, a method of making means operable generally for maintaining a desired cycle rate with acceptable droop in a thermostat, a method of making a thermostat, a method of operating a thermostat, and a method of operating an anticipator for a thermostat.

70 Claims, 9 Drawing Figures

TO COMMON TERMINAL 155

THERMOSTAT AND ANTICIPATOR THEREFOR AND METHODS OF OPERATING AND MAKING SUCH

BACKGROUND OF THE INVENTION

This invention relates generally to temperature control systems and in particular to a thermostat for use therein, an anticipator for a thermostat, a method of making a thermostat, a method of operating a thermostat, a method of making means operable generally for maintaining a desired cycle rate with acceptable droop in a thermostat, and a method of operating an anticipator for a thermostat.

In the past, various apparatus, such as anticipators or the like, and various methods have been employed in various types of thermostats for controlling the cycle rate thereof with accompanying acceptable droop. Droop is a condition well known in the art occurring in all thermostats, and droop may be thought of as the difference in the average temperature controlled by the thermostat when minimun heat is required as compared with the average temperature when maximum heat is required. When an anticipator is employed with the temperature sensing means of the thermostat, droop is the difference between the basic temperature differential of the thermostat and the absolute temperature rise of the temperature sensing means of the thermostat due to anticipator heat. For instance, a good thermostat for contemporary heating systems may have generally about five cycles to about seven cycles per hour with a minimum or acceptable droop of less than approximately 2° F.

In general, thermostats are optomized to function with a given set of characteristics, i.e. cycle rate and droop. These characteristics depend on the basic temperature differential of the thermostat, i.e. the difference between the "on" temperature and the "off" temperature of the temperature sensing means of the thermostat, the thermal mass of the temperature sensing means, the heating of the temperature sensing means, the heating of the temperature sensing means by an anticipator, and the cooling of the temperature sensing means. Since the temperature differential of the thermostat, the thermal mass of the temperature sensing means and the cooling thereof are fixed values for any one thermostat, it is apparent that the thermostat's characteristics are fixed except for the influence of the anticipator thereon. Therefore, the characteristics of any one thermostat will change when the heat of the anticipator is changed, i.e. an increase in heat will increase both the cycle rate and the droop. As well known in the art, when the droop condition for any one thermostat is bettered, a relatively slower cycle rate is effected. However, a slow cycle rate tends to cause large swings, i.e. large opening differentials, in room temperature. Tt is therefore apparent that a system for maintaining generally constant anticipator heating is desired.

In the operation of any particular thermostat, it is desirable to maintain or control a desired cycle rate for the thermostat with acceptable droop, and this has been accomplished in the past by providing various types of anticipators or auxiliary heaters in conjunction with the thermostat,. In general, at least some of the past anticipators were disposed within thermostats for transmitting heat to the temperature sensing mechanism or bimetal thereof. Of course the added heat caused the thermostat to become satisfied before the temperature of the space controlled by the thermostat reached the selected or set-point temperature thereof. In this manner, satisfaction of the thermostat was anticipated to prematurely turn off the heating system for the controlled space thereby to eliminate or at least control overshoot of the temperature in the controlled space.

In at least some of the past thermostats, the switching or other power responsive elements thereof created heat which was also additive to that sensed by the temperature sensing mechanism of the thermostat thereby to affect the droop and cycle rate characteristics of the thermostat. In some instances, an attempt was made to physically separate or isolate these power responsive, heat creating elements from the temperature sensing mechanism or bimetal of the thermostat. At least one of the disadvantageous or undesirable features of this particular type of past thermostat is believed to be the impractability of effecting such separation of parts within the thermostat as well as the increased size and cost thereof which may have been engendered by such separation.

In other past thermostats, an auxiliary heater or anticipator and a regulating control therefor were incorporated to differentially provide supplemental heat additive to that of the aforementioned power responsive, heat creating elements of the thermostat. In this manner, the heat added to the temperature sensing mechanism of the thermostat was maintained at a constant value thereby to effect a selected and constant droop throughout the operating range of the thermostat. At least one disadvantageous or undesirable feature of this particular type of past thermostat is believed to be that the anticipator and regulating control therefor was continuously "on" thereby to consume and waste power. Also other disadvantageous features are believed to be that with the addition of the regulating control for the anticipator, the circuitry of the thermostat naturally became more complex, the thermostat may have increased in size, and of course, the cost thereof undoubtedly increased.

In some other past thermostats, anticipators of the solid state type, such as thermistors for instance, were utilized in rather complicated bridge circuitry, and it may be that such complexity itself was a disadvantageous or undesirable feature not to mention the cost and maintenance which may have been involved.

Solid state elements, such as the aforementioned thermistors, have also been utilized as heaters in other circuitry and systems. One such system employed a thermistor as a heater for controlling expansion and contraction of a thermally responsive material for driving a piston or control arm for instance. However, it is apparent that such usage of thermistors is not analogous to the anticipator art for thermostats.

Some of the past anticipators utilized in thermostats were generally constituted by a wound coil with a movable arm for adding or subtracting a selected number of coil turns into the coil energizing circuit. In this manner, the amount of heat added by the anticipator to the temperature sensing mechanism of the thermostat could be regulated. However, one of the disadvantageous or undesirable features of this particular type of anticipator is believed to be that it was necessary to adjust it in the field during installation of the thermostat. Another disadvantageous or undesirable feature of such adjustable anticipators is believed to be that the field adjustment thereof may not have been correlative with the power draw of the control unit, such as a solenoid, relay or gas valve for controlling the system heat source with which the thermostat and anticipator was in circuit. Also incorrect cycle rates would be incorrect for desired comfort level due to the improper amount of heat from the anticipator being transferred to the sensing element.

Further, in many of the past anticipators, heat was transferred primarily by conduction from the heat generating means thereof to the means for transferring such heat to the bimetal of the thermostat. One of the disadvantageous features of this particular type of past anticipator is believed to be that the heat generating means necessarily was operated at relatively low temperatures and was responsive to voltage variations so that the rate of heat generated was variable.

SUMMARY OF THE INVENTION

Among the several objects of the present invention may be noted the provision of a thermostat, a method of making a thermostat, a method of operating a thermostat, an anticipator for controlling the cycle rate and the droop in a thermostat, and a method of making means operable generally for maintaining a desired cycle rate with acceptable droop in a thermostat which overcome the disadvantageous or undesirable features discussed hereinabove, as well as other, with respect to the past thermostats and anticipators therefor; the provision of such anticipator having wattage or heat output which changes only within a generally small predetermined range irrespective of the electrical energization thereof within selected limits; the provision of such anticipator in which the rate of heat generated therein is generally constant; the provision of such anticipator wherein the heat generating means thereof is adapted for operation at temperature appreciably in excess of the ambient temperature; the provision of such thermostat wherein the operation of a temperature selecting means thereof throughout its predetermined temperature range results only in a generally small amount of change within a selected predetermined range of heat supplied to a temperature sensing means of the thermostat by an anticipator therefor; the provision of such thermostat, such anticipator and such methods in which means for supplying or generating heat is enclosed within means for transferring the heat and disposed in a predetermined spaced relation therewith; the provision of such thermostat, such anticipator, and such methods in which the heat is transferred from the heat supplying or generating means to the heat transferring means primarily by convection; the provision of such thermostat, such anticipator, and such methods in which the heat supplying or generating means is mounted by means for energizing it; the provision of such thermostat in which means for supplying heat is energized from a power source other than a circuit having means therein to which the heat supplying means is supply the heat; the provision of such thermostat, such anticipator, and such methods wherein the heat supplying or generating means provides a selected amount of heat within a generally small predetemined variance range thereby to obviate adjusting mechanism or regulating controls therefor; and the provision of such thermostat, such anticipator, and such methods which are simplistic in nature and design, effect economy in manufactured, and are easily assembled. Other objects and advantageous features of the invention will be in part apparent and in part pointed out hereinafter.

In general and in one form of the invention, and anticipator is provided for controlling the cycle rate and droop of a thermostat. The anticipator has means for transferring heat supplied thereto, and means enclosed within the heat transferring means for supplying the heat thereto is disposed in spaced relation and in heat transfer relation therewith.

Further in general and in one form of the invention, a thermostat has means for sensing temperature of a space in which the thermostat may be located and means operable generally as an anticipator for the thermostat to attain a desired cycle rate with acceptable droop therefor. The anticipator also includes means for transferring heat supplied thereto to the temperature sensing means, and means adapted to be energized for supplying the heat to the heat transferring means is enclosed within the heat transferring means in heat transfer relation therewith.

Also in general, a thermostat in one form of the invention is provided with an electrical circuit, and means is selectively operable for enabling the circuit. Means is movable in response to a sensed temperature for controlling the completion and the interruption, respectively, of the circuit when it is enabled. Further, means is adapted to be energized from a power source other than the circuit for supplying heat to the controlling means to maintain a selected cycle rate thereof with acceptable droop in the thermostat upon the enabling of the circuit.

In general, there is also provided a method in one form of the invention for making means operable generally for maintaining a desired cycle rate with acceptable droop in a thermostat. In this method, means adapted to be energized for generating heat is mounted in predetermined spaced relation to means for supporting it. The supporting means is then attached to means for transmitting the heat and enclosing the heat generating means within a generally isolated chamber formed between the supporting means and the heat transmitting means so that the heat generating means is also disposed in predetermined spaced relation with the heat transferring means.

Also in general, a method in one form of the invention is provided for making a thermostat having means for sensing temperature of a space in which the thermostat may be located and means operable generally as an anticipator in the thermostat for maintaining a desired cycle rate thereof with acceptable droop. In this method, means adapted to be energized for generating heat is mounted to one of a pair of housing portions of the anticipator so that the heat generating means is enclosed within a generally isolated chamber formed between the housing protions. The other of the housing portions is then coupled in thermal conductive relation with the temperature sensing means.

Further in general and in one form of the invention, a method is provided for operating a thermostat having means for sensing temperature of a space in which the thermostat may be located. In this method, means operable generally for generating heat is energized, and the heat is transferred to means for generally enclosing the heat generating means. The heat is then conducted from the enclosing means to the temperature sensing means for effecting a selected cycle rate thereof in the thermostat with acceptable droop.

BRIEF DESCRIPTION OF THE DRAWINGS

Corresponding reference characters indicate corresponding parts throughout the several view of the drawings.

The exemplifications set out herein respectively illustrate the invention in one form thereof, and such exemplifications are not to be construed as limiting in any manner.

DETAILED DESCRIPTION OF THE PREFERRED EMBODIMENTS

Figure 5:
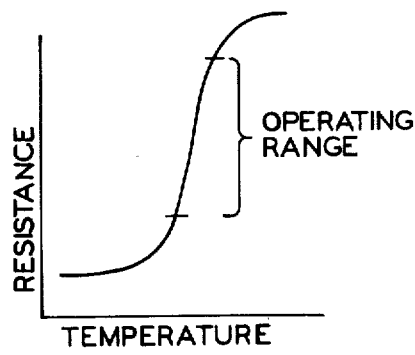
FIG. 5 is a graphical representation of a temperature-resistance curve for a typical positive temperature coefficient resistor which may be utilized as a heat source or heat generating means in the anticipator of FIG. 1.
Figure 6:
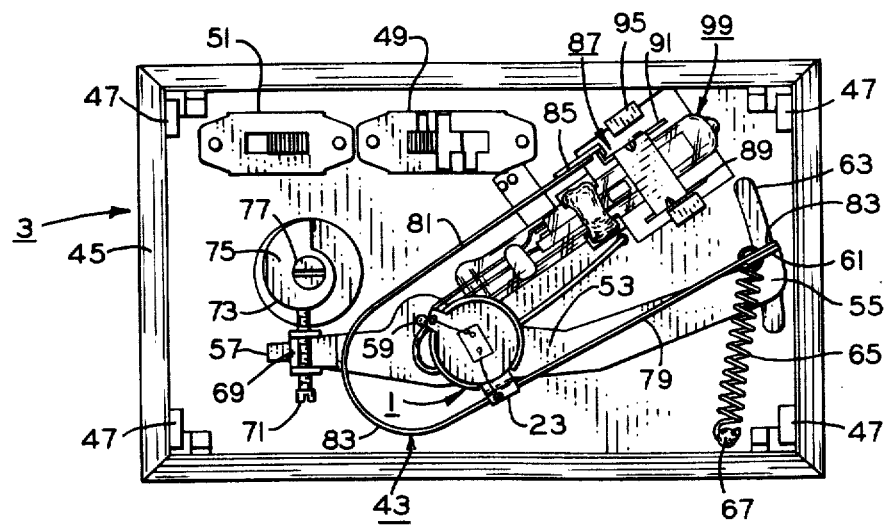
FIG. 6 is a plan view of a thermostat in one form of the invention and illustrating principles of methods for both operating and making a thermostat in one form of the invention, respectively.

Referring now to the drawings in general, there is shown at 1 an anticipator (FIGS. 1–5, 7 and 8) in one form of the invention for controlling the cycle rate and the droop of the thermostat 3 (FIG. 6). Anticipator 1 has means indicated generally at 5, for transferring or transmitting heat supplied thereto, and means, such as a positive temperature coefficient resistor 7 (hereinafter referred to as a PTCR) or other component which may be energized to generate heat, is enclosed within heat transferring means 5 for supplying the heat thereto and is disposed in heat transfer relation therewith.

Figure 1:
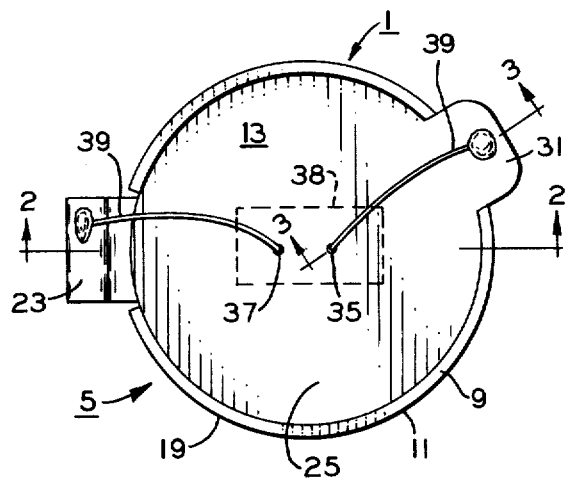
FIG. 1 is a plan view of an anticipator in one form of the invention.
Figure 2:
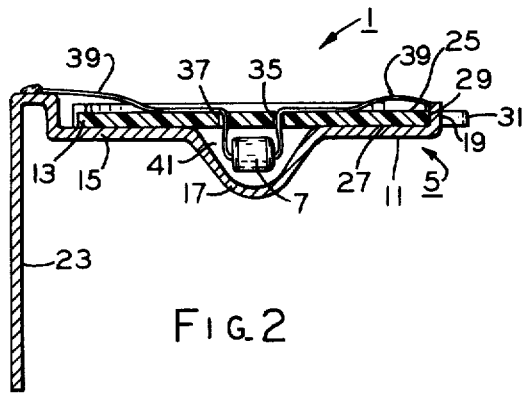
FIG. 2 and 3 are sectional views taken along line 2—2 and line 3—3, respectively, of FIG. 1.
Figure 3:
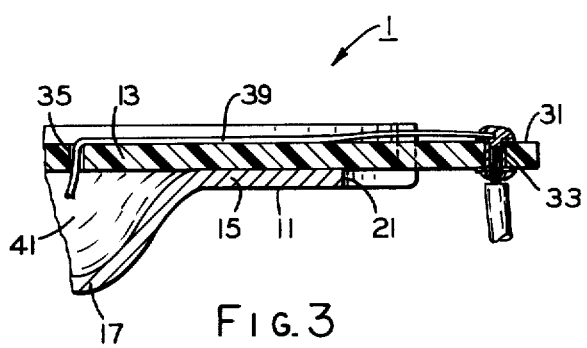
Figure 4:
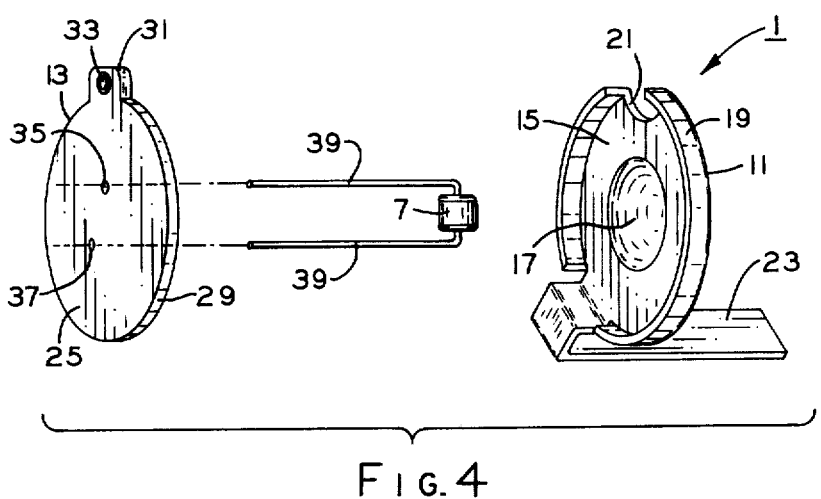
FIG. 4 is an exploded perspective view of the anticipator of FIG. 1 illustrating, at least in part, principles of a method in one form of the invention of making the anticipator.

More particularly and with specific reference to FIGS. 1-3, heat transferring means 5 of anticipator 1 includes a housing 9 having a metallic member or portion 11 with good thermal transfer characteristics or properties and an insulating member or portion 13 with good electrical and thermal or heat insulating characteristics or properties. While metallic member 11 is shown as being recessed or generally cup-shaped and insulating member 13 as being generally disc-shaped for purposes of disclosure, it is contemplated that both the metallic member and the insulating member may be provided with other shapes or forms within the scope of the invention.

Metallic member 11 is provided with a base wall 15 having a generally dome-shaped portion or recess 17 integrally extending from the base wall generally centrally thereof, and an upstanding, generally annular side wall 19 is integrally formed with the base wall adjacent the periphery thereof. Side wall 19 extends generally axially from the base wall 15 in a direction generally opposite to the extension of dome shaped portion 17 therefrom. An aperture or slot 21 is provided through both base wall 15 and side wall 19. Means, such as a tab, strap or other similar extension 23, for connection in conductive heat transfer relation with a component of thermostat 3 is integrally formed with side wall 19 of metallic member 11 which has at least a portion lanced therefrom, as discussed hereinafter. While tab 23 is shown for purposes of disclosure as integrally formed with metallic member 11, it is contemplated that the tab could be separately formed and connected to the metallic member by suitable means well known to the art within the scope of the invention.

As previously mentioned, insulating member 13 is generally disc-shaped having opposite and relatively flat faces 25, 27 intersecting with or bounded by a generally annular or peripheral margin or edge 29. When metallic member 11 and insulating member 13 are mounted or assembled together, as described in greater detail hereinafter, interior face 27 of the insulating member may be seated on or at least disposed in close proximity with base wall 15 of the metallic member, and peripheral edge 29 of the insulating member may be press-fitted, interference-fitted, crimped, staked, or otherwise connected by suitable means in displacement preventing engagement with side wall 19 of the metallic member. A hub or node 31 having an opening 33 therethrough for electrical lead location purposes, as discussed hereinafter, is integrally formed on insulating member 13 extending generally radially from peripheral edge 29 thereof and projecting through aperture 21 in metallic member 11. Means, such as a pair of apertures or passages 35, 37, for the passage therethrough of a pair of electrical leads 39, as discussed hereinafter, is generally centrally provided in insulating member 13 intersecting with opposite faces 25, 27 thereof. A generally isolated chamber 41 is defined interiorly of dome-shaped portion 17 between metallic member 11 and insulating member 13 upon the assembly thereof, and passages 35, 37 in the insulating member are disposed so as to communicate with the chamber. It may be noted that dome-shaped portion 17 is provided generally to gather and contain the heat generated by PTCR 7 upon the energization thereof so that a maximum amount of such generated heat may be transferred primarily by convection from the PTCR to metallic member 11 while maintaining heat losses to the ambient atmosphere to which anticipator 1 may be subjected at a minimum. While dome-shaped portion 17 is shown for purposes of disclosure, it is contemplated that portions having other shapes may be provided in metallic member 11 thereby to form chamber 41 within the scope of the invention.

Of course, PTCR 7 is illustrated as the heat generating means or heat supplying means of anticipator 1 only for the purposes of disclosure, and it is contemplated that other types of devices or means for generating heat upon energization thereof may be employed as the heat source in anticipator 1 within the scope of the invention. PTCR 7 is a solid state component formed from various materials well known to the art and having a characteristic, when energized, of increasing its resistance only in response to voltage applied thereto and generally as a function of temperature. A graphical representation of this characteristic for a typical PTCR is illustrated in FIG. 5, and the curve thereof is shown only to illustrate the functional relationship between the temperature and the resistance of a PTCR in response to applied voltage. It is, of course, well known in the art that each different PTCR will exhibit its own particular resistance-temperature curve. Electrical leads 39 are both electrically and structurally attached to PTCR 7 by suitable means, such as electrical conducting cement or the like (not shown), and the PTCR is disposed within chamber 41 in predetermined spaced relation with respect to both metallic member 11 and insulating member so that the PTCR transmits heat primarily by convection to the metallic member. Of course, electrical leads 39 pass through passages 35, 37 in insulating member 13 and may be disposed on or adjacent exterior face 25 thereof for circuit connections, as discussed hereinafter. It may be noted that electrical leads 39 are not only the sole structural support for mounting PTCR 7 within chamber 41 but also constitute means for effecting energization of the PTCR. Further, it may also be noted that electrical leads 39 generally constitute means for disposing PTCR 7 in predetermined spaced relation with metallic member 11 and insulating member 13.

Referring now again to the drawings in general, there is illustrated a method in one form of the invention (FIG. 4) for making means, such as anticipator 1, operable generally for maintaining a desired cycle rate with acceptable droop in a thermostat 3 (FIG. 6). In this making method, means, such as a heat source or PTCR 7, adapted to be energized for generating heat is mounted in predetermined spaced relation to means, such as insulating member 13, for supporting it. Supporting means or insulating member 13 is then attached to means, such as metallic member 11, for transmitting the heat and enclosing the heat generating means or PTCR 7 within generally isolated chamber 41 formed between the insulating member and heat transmitting means or metallic member 11 so that the PTCR is also disposed in predetermined spaced relation with the metallic member (FIGS. 1-4)

More particularly and with specific reference to FIGS. 1-4, PTCR 7 is both electrically and structurally connected with electrical leads 39 by suitable means, such as electrically conducting cement for instance as previously mentioned. While this connection of PTCR 7 and leads 39 is illustrated for purposes of disclosure, it is contemplated that such connection may be made by other means or in other manners or that the PTCR material may be formed or otherwise built-up about an electrical lead within the scope of the invention. With PTCR 7 so mounted or connected to leads 39, the leads are then inserted, either individually or conjointly, through passages 35, 37 in insulating member 13 so that the PTCR is disposed in predetermined spaced relation with interior face 27 of the insulating member. Although PTCR 7 is shown spaced from insulating member 13 in the preferred exemplification of the invention, it is contemplated that PTCR may engage the insulating member within the scope of the invention; however, it is believed that such engagement would deleteriously affect the wattage output or heat generating effect of the PTCR upon energization thereof. When electrical leads 39 have been inserted through passages 35, 37 in insulating member 13, the electrical leads may be laid over into abutment with exterior face 25 of the insulating member. Means, such as a piece of electrical insulating tape or other suitable or desirable adhesive material as shown in dotted outline at 38 in FIG. 1, may be applied to electrical leads 39 and exterior face 25 of insulating member 13 for maintaining them in their assembled relation. In this manner, electrical leads 39 are maintained against displacement from insulating member 13 not only to position the leads for subsequent circuit connection but also to maintain PTCR disposed in its predetermined spaced relation relative to interior face 27 of the insulating member.

Insulating member 13 with PTCR 7 and electrical leads 39 mounted thereto is then attached or assembled to metallic member 11. To effect such attachment, insulating member 13 is disposed with its node 31 adjacent aperture 21 for receiving it in metallic member 11, and at least one of the insulating member and the metallic member is moved relative to the other thereof thereby to position or assemble peripheral edge 29 of the insulating member within side wall 19 of the metallic member. Upon the assembly of metallic member 11 and insulating member 13 into engagement with each other, at least a part or portion of PTCR 7 is disposed or suspended within chamber 41, and interior face 27 of the insulating member engages base wall 15 of the metallic member. The engagement of interior face 27 with base wall 15 serves not only to limit the relative movement of metallic member 11 and insulating member 13 upon the assembly thereof but also serves to establish or define the predetermined spaced relationship between the metallic member and PTCR 7. As previously mentioned, peripheral edge 29 of insulating member 13 is pressfitted, or interference-fitted into displacement preventing engagement with side wall 19 of metallic member 11 however, if desired, side wall 19 may be subsequently crimped, staked or otherwise urged into the displacement preventing engagement with peripheral edge 29 of insulating member 13 within the scope of the invention. Of course, such engagement between peripheral edge 29 and side wall 19 not only prevents relative displacement of metallic member 11 and insulating member 13 but also serves to generally centrally locate PTCR 7 within chamber 41 thereby to also assist in the establishment or maintenance of the predetermined spaced relation between the PTCR and the metallic member. It is desirable to maintain PTCR 7 predeterminately spaced from metallic member 11 so that the heat may be contained within housing 9 of anticipator 1 with minimum loss to the ambient and so that the heat may be transferred primarily by convection from the PTCR to metallic member 11 of the anticipator. Any touching or engagement between PTCR 7 and metallic member 11 would create a heat sink causing a heat run-away by the PTCR upon energization thereof. To complete the discussion of the making method for anticipator 1, the formation of means, such as tab 23, on metallic member 11 for coupling it in thermal conductive relation to a temperature sensing component, as discussed hereinafter, of thermostat 3 may occur prior to the assembly or attachment of the metallic member with the insulating member as does the formation of the dome-shaped portion 17 in the metallic member.

Referring again in general to the drawings, there is illustrated a method in one form of the invention for operating anticipator 1 (FIGS. 4 and 8) for thermostat 3 (FIG. 6). In this operating method, means for generating heat, such as PTCR 7, in anticipator 1 is energized to an operating temperature appreciably in excess of the ambient temperature in which the anticipator may be located. The heat so generated is transferred from heat generating means or PTCR 7 to means for encasing the PTCR generally at a constant rate.

More particularly, it is preferred to operate heat generating means 7 of anticipator 1 at temperature values appreciably in excess of the ambient to which the anticipator may be subjected. This is desirable since a greater differential between the operating temperature of heat generating means 7 and the ambient temperature results in the heat output or wattage of anticipator 1 becoming percentage-wise more constant. To illustrate, it may be noted that PTCR 7, when energized, is operable generally at the higher temperature values shown therefor in the graphical representation of the resistance-temperature curve of FIG. 5. When energized, PTCR 7 very rapidly attains its operating temperature which is appreciably in excess of the ambient temperature in which anticipator 1 may be located. If the operating or surface temperature of the PTCR is about 270° F. and the ambient temperature in the comfort range of between about 55° F. and about 80° F, then the differential between the PTCR operating temperature and the extreme values of the ambient comfort range temperature is, of course, respectively about 190° F. and 215° F. This means that there is only about a 12% change in wattage of anticipator 1 between the temperature settings or set-points of 55° F. through 80° F. of thermostat 3. Of course, if PTCR materials are utilized which can attain a higher operating or surface temperature, then the differential between such higher operating temperature and the ambient temperature would be increased resulting in a correspondingly decreased percent change in wattage between the set-point temperature of 55° F. through 80° F of thermostat 3. Such a small percentage of total output wattage or heat over the predetermined range of set-point temperatures, i.e. from 55° F to 80° F., in which thermostat 3 may be designed to operate would be, for the most part, undecernable; therefore; for all practical purposes, anticipator 1 may be thought of as being a generally constant heat generating device. In this vein, since PTCR 7 is normally operated at the higher values of temperature where there is a high resistance change to temperature change as illustrated in the graphical representation of FIG. 5, it may be noted that the output wattage or heat of the PTCR is virtually unaffected by changes in voltage for the normal extremes of voltage changes encountered. In other words, the slope of the temperature-resistance curve shown in FIG. 5 is so steep that PTCR 7 may be brought up to its operating temperature with a very small voltage input, for example about 15 volts in a thermostat designed to operate in a voltage range generally between about 18 volts and about 30 volts. Therefore, it may be noted that voltage change within the thermostat range of 18 volts to 30 volts has such little affect on the rate of the wattage output of PTCR 7 that such rate may, for all practical purposes, be thought of as being generally constant.

As well known in the art, thermostats may have a chimney effect wherein ambient air in the space that the thermostat may be located is drawn through the thermostat thereby to establish convective currents or air flow over the thermostat anticipator. Such chimney effect acted to dissipate or carry away heat from the anticipator; however, it may be noted that encasing PTCR 7 within housing 9 of anticipator 1 isolates the PTCR from the convective air flows of the chimney effect. In this manner, encasement by housing 9 of anticipator 1 serves to trap or preserve the output watts or heat of PTCR 7 so that heat may be transferred at a maximum rate from PTCR 7 to metallic number 11 of housing 9 in anticipator 1 with a minimum of heat loss due to the chimney effect of the particular thermostat in which the anticipator may be located. It may also be noted that, for the most part, the heat generated by PTCR 7 is conveyed primarily by convection to metallic member 11 due to the encasement of PTCR 7 in anticipator housing 9 in the aforementioned predetermined space relation therewith.

With reference again in general to the drawings, thermostat 3 (FIG. 6) in one form of the invention has means, such as a bimetal strip 43, for sensing temperature of a space (not shown) in which the thermostat may be located. Means for operation generally as an anticipator, such as anticipator 1 discussed hereinbefore, is provided in thermostat 3 to attain a desired cycle rate with acceptable droop for the thermostat. Anticipator 1 includes means, such as housing 9, for transferring heat supplied thereto to temperature sensing means or bimetal strip 43, and means, such as PTCR 7, adapted to be energized for supplying the heat to heat transferring means or housing 9 is enclosed within the housing primarily in convection heat transfer relation therewith.

More particularly and with specific reference to FIG. 6, thermostat 3 is provided with a base 45 on which various operating components of the thermostat are mounted, and post structures 47 are provided adjacent the corners of the base for removably mounting a cover for the thermostat which has been omitted for the sake of drawing simplicity. A pair of switches 49, 51 are mounted to the base for selectively enabling the operating modes of the thermostat and for controlling operation of a system fan (not shown). Thermostat 3 is generally of the type shown and described in U.S. Pat. No. 3,573,698 issued Apr. 6, 1971 to Stanley R. Mitick, and reference may be had to this patent for a more detailed discussion of the operating components of the thermostat if desired.

An elongate pivot arm 53 having generally opposite free or distal ends 55, 57 is pivotally mounted on base 45 to a pivot pin, such as a rivet 59 or the like, retained in the base. One of the distal ends 55 is provided with an integral retainer or upwardly bent tab 61, and the one distal end is slidably and guidably engaged with a generally arcuate ridge 63 on base 45. Means, such as a spring 65, is biased between retainer 61 of distal end 55 and a post 57 provided on base 45 for pivotally or resiliently urging pivot arm 53 in a clockwise direction (as seen in FIG. 6) about pivot pin 59. On the other opposite distal end 57 of pivot arm 53, there is fixed by suitable means well known to the art (not shown) a generally U-shaped bracket 69 in which an adjusting or operating screw 71 is threadedly or adjustably received. The resilient force of spring 65 acting on pivot arm 53 is effective to pivotally urge an end of adjusting screw 71 toward abutting or following engagement with a camming surface 73 of a cam 75. Cam 75 is integral with a shaft 77 which is rotatably retained in base 45 by suitable means well known in the art (not shown), and a manually operated knob, which is omitted for drawing simplicity, may be attached to the shaft for conjointly rotating it and the cam through a predetermined arc or a plurality of temperature settings or set-points constituting a predetermined range of temperature in which thermostat 3 is operable. When cam 75 is rotated, camming surface 73 thereof drives against adjusting screw 71 so as to pivot or rotate pivot arm 53 about pivot pin 59 causing distal end 61 to move on arcuate surface 63, and of course, the resilient force of spring 67 either assists or opposes the pivotal movement of the pivot arm depending upon the direction in which the cam is rotated.

Bimetal strip 43 has a pair of laterally spaced, generally parallel and coextensive legs 79, 81 which are interconnected by a portion 83 integrally formed therebetween and having a generally U-shaped configuration. Legs 79, 81 of bimetal strip 43 are provided with distal end portions 83, 85, and end portion 83 is fixedly connected by suitable means well known to the art, such as spot welding or rivets or the like (not shown), to retainer 61 of pivot arm 53 while a bifurcated yoke or armature 87 is carried on end portion 85 of leg 81. Armature 87 is also fixedly connected by suitable means well known to the art, such as spot welding or riveting or the like (not shown), to leg end portion 85, and a pair of spaced apart, generally parallel, depending fingers or abutments 89, 91 are integrally provided on the armature for abutting or motion limiting engagement with a pair of spaced stops 93, 95 which extend generally upwardly from base 45.

As previously mentioned, bimetal legs 79, 81 are generally parallel although they may either slightly converge or diverge depending upon the desired prestressing thereof and the temperature of bimetal strip 43. When cam 75 is rotated to effect the selection of a desired set-point temperature throughout the predetermined temperature range of thermostat 3, distal end 55 of pivot arm 53 is pivoted in the clockwise direction, as discussed hereinabove, and retainer 61 on the pivot arm carries bimetal strip 43 generally as a unit conjointly with the distal end 55 until finger 89 of armature 87 engages stop 93. Further clockwise movement of pivot arm 53 will effect divergence of bimetal legs 79, 81 as retainer 61 of the pivot arm continues to drive bimetal leg 79 in the clockwise direction while the engagement of armature finger 89 with stop 93 prevents further conjoint movement of the armature 87 end of bimetal leg 81. Of course, this driven movement of bimetal strip 43 stresses it, and such stress may be overcome by a temperature change in the bimetal strip in order to effect return movement of its leg 81 relative to leg 79 to re-engage finger 91 of armature 87 with its stop 95.

In a similar manner, counterclockwise movement of pivot arm 53 (as seen in FIG. 6) will move bimetal strip 43 generally as a unit until armature finger 91 becomes engaged with its cooperating stop 95. Thereafter, additional counterclockwise movement of retainer 61 and bimetal leg 79 causes convergence thereof with respect to bimetal leg 81 as armature 87 on end portion 85 of bimetal leg 81 is restrained by engagement with its stop 95 from further counterclockwise movement. This driven movement of bimetal strip 43 also stresses it, and as previously mentioned, such stresses may be overcome by a temperature change in the bimetal strip in order to effect return movement of its leg 79 relative to leg 81 to re-engage finger 89 with its cooperating stop 93. It may be noted that stops 93, 95 generally define predetermined opposite or extreme positions for fingers 89, 91 of armature 87 enabling bimetal strip to be prestressed so as to effect selective altering or changing of the selected or control temperature setting or set-points of thermostat 3. Adjusting screw 71 serves as means for adjustably setting or precalibrating thermostat 3 so that it does in fact operate at the set-point selected therefor. Thus, cam 73 is selectively operable to adjustably set the control temperature or set-point temperature for bimetal strip 19, and the cam and its cooperating components generally constitute means selectively operable through a predetermined range of settings for controllably effecting a desired temperature in a space in which thermostat 3 may be located.

As previously mentioned, if a thermostat would be allowed to respond only to temperature of a space in which the thermostat was located, there would be overshoot in both the temperature increasing and decreasing directions with respect to the set-point temperature selected for the thermostat. In other words, if the thermostat was operable, i.e. set or adjusted, to turn off the heating system when the temperature in the space or room reached 70° F, by way of example, the temperature in the space may actually rise somewhat above 70° F. Of course, when the heating system is off, the temperature in the space may actually fall somewhat below 70° F. before the thermostat functions to actuate the heating system. This variance of temperatures with respect to the set-point temperature at which a thermostat is actually operable is generally referred to as operating differential or room temperature swing. In order to maintain a low operating differential within an acceptable or generally small range, anticipator 1 is provided to control cycle rate by preheating bimetal strip 43. Thus, bimetal strip 43 will attain the set-point temperature before the temperature in the space attains the value of the set-point temperature so as to limit the overshooting effect and maintain the room temperature differential within acceptable limits.

Figure 7:
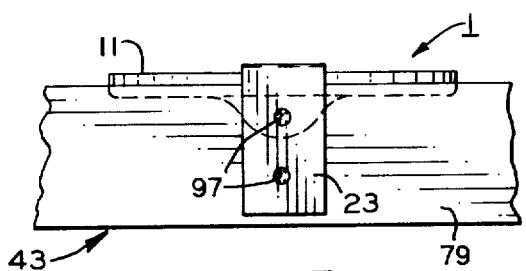
FIG. 7 is a fragmentary view illustrating the attachment of the anticipator to a bimetal strip or temperature sensing means of the thermostat of FIG. 4.

In order to control or maintain a selected or desired cycle rate of thermostat 3 with acceptable droop, anticipator 1 is provided to transfer heat generated by PTCR 7 upon energization thereof to bimetal strip 43, i.e. to preheat it. Tab 23 of metallic member 11, described hereinabove with respect to anticipator 1, is disposed generally across the width of bimetal leg 79 in direct engagement or conductive heat transfer association therewith, and the tab is fixedly connected by suitable means, such as a plurality of spot welds 97 or the like for instance, to the bimetal leg, as shown in FIG. 7. In this manner, tab 23 is not only effective to transmit by conduction to bimetal leg 79 the heat generated by anticipator 1 but also serves to mount the anticipator to bimetal strip 43.

The heat anticipator assembly should be attached to the bimetal at a point where the minimum amount of watts is required to provide the desired cycle rate. The heat for anticipation results in thermostat droop. Therefore, the minimum amount of droop will be attained using the lowest possible watts of anticipator heat.

PTCR 7 of anticipator 1 is controlled, i.e. selectively energized and de-energized, by a magnetically operated switch, indicated generally at 99, which is connected in circuit relation with the PTCR, as discussed in greater detail hereinafter. Switch 99 is operable generally in response to movement of armature 87 between its extreme or opposite positions upon the thermal actuation of bimetal strip 43, as discussed hereinabove, to respectively complete and interrupt the application of voltage to PTCR 7 for respectively energizing and de-energizing it. While magnetically operated switch 99 is shown for purposes of disclosure, it is contemplated that other types of switches well known to the art may be utilized within the scope of the invention.

From the foregoing and referring again to the drawings in general, it may be seen that thermostat 3 in one form of the invention has means, such as bimetal strip 43, for sensing temperature of a space in which the thermostat may be located and also means, such as cam 75, selectively operable through a predetermined range of settings for controllably effecting a desired temperature in the space (FIG. 6). Means, such as anticipator 1, is operable generally for maintaining a desired cycle rate with acceptable droop for thermostat 3 and includes means, such as anticipator housing 9 and its tab 23, coupled with bimetal strip 43 for transferring heat thereto. Anticipator 1 also includes means, such as PTCR 7, enclosed within heat transferring means or housing 9 and adapted to be energized for generating the heat and supplying it to the housing at a temperature appreciably in excess of the desired temperature in the space wherein operation of the selectively operable means or cam 75 through its predetermined range of temperature settings results only in a generally small amount of change in the heat supplied by the PTCR (FIGS. 1–7).

There is also illustrated a method in one form of the invention of making thermostat 3 having means, such as bimetal strip 43, for sensing temperature of a space in which the thermostat may be located and also means, such as anticipator 1, operable generally in the thermostat for maintaining a desired cycle rate thereof with acceptable droop (FIG. 6). In this making method, means, such as PTCR 7, adapted to be energized for generating heat is mounted to one of a pair of housing portions 11, 13 of anticipator 1 so that the PTCR is enclosed within generally isolated chamber 41 formed between the housing portions (FIGS. 1–4), and the other of the housing portions 11, 13 is then coupled in thermal conductive relation with bimetal strip 43 (FIG. 7).

There is also illustrated a method in one form of the invention of operating thermostat 3 having means, such as bimetal strip 43, for sensing temperature of a space in which the thermostat may be located (FIG. 6). In this operating method, means, such as PTCR 7, operable generally for generating heat is energized, and the heat is transferred, at least in the most part by convection, to means, such as anticipator housing 9, for generally enclosing the heat generating means or PTCR. The heat is then conducted from enclosing means or housing 9 to temperature sensing means or bimetal strip 43 for effecting a selected cycle rate thereof in thermostat 3 with acceptable droop.

Figure 8:
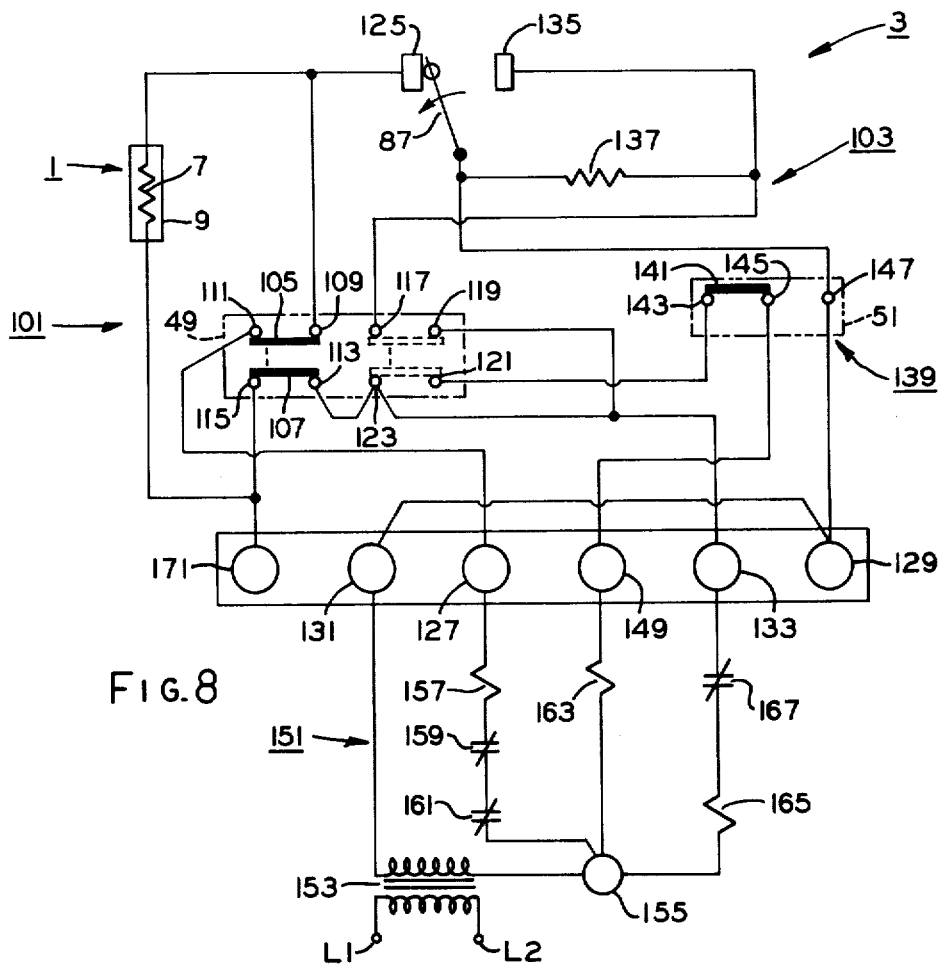
FIG. 8 is a schematic diagram of circuitry in one form of the invention for the thermostat of FIG. 4.

Referring now to FIG. 8, thermostat 3 in one form of the invention is provided with a heating circuit 101 and a cooling circuit 103, and means, such as switch 49, is selectively operable for enabling one of the heating circuit and the cooling circuit. Means, such as bimetal strip 43, is movable in response to a sensed temperature for controlling the completion and the interruption, respectively, of the enabled one of the heating circuit 101 and the cooling circuit 103. Further, means, such as PTCR 7, is connected in cooling circuit 103 and energized upon the enabling of heating circuit 101 for supplying heat to controlling means or bimetal strip 43 to maintain a selected cycle rate thereof with acceptable droop in thermostat 3.

More particularly, switch 49 is manually operable to its heating mode enabling heating circuit 101 when its pair of mechanically linked contact bars 105, 107 make with contacts 109, 111 and 113, 115, respectively.

Contacts 117, 119 and 121, 123 of switch 49 are provided in cooling circuit 101 for enabling thereof when contact bars 105, 107 are respectively made with these contacts. As may be recalled, magnetically operable switch 99 is actuated between energizing and de-energizing positions by fingers 89, 91 of armature 87 on bimetal strip 43 in response to movement of the armature between its extreme or opposite positions. In its energizing position, as shown in FIG. 8, magnetically operated switch 99 is engaged with a heating contact 125 thereof in heating circuit 101 thereby to complete the heating circuit when it is enabled by switch 49. Upon such completion of heating circuit 101, power may flow from a thermostat terminal 127 through contact bar 105 and contacts 109, 111 to heating contact 125 of magnetically operated switch 99. Therefrom, power flows through switch 99 when engaged with its heating contact 125 to a pair of thermostat terminals 129, 131 which are interconnected. It may be noted that PTCR 7 of anticipator 1 is connected across heating circuit 101, and when the heating circuit is enabled by switch 49, the PTCR is energized through cooling circuit 103. For instance, with contact bar 107 made between contacts 113, 115 of switch 49 and magnetically operated switch made with its heating contact 125, power may flow through cooling circuit 103 from a thermostat terminal 133 through contact 123 and therefrom through contact bar 107 made with contacts 113, 115 to PTCR 7 for effecting the energization thereof. Of course, power flows from PTCR 7 through magnetically operated switch 99 and its heating contact 125 to interconnected thermostat terminals 129, 131, as previously mentioned.

When contact bars 105, 107 of switch 49 are manually moved into making engagement with contacts 117, 119 and 121, 123, respectively, as illustrated by the dotted lines in FIG. 8, of cooling circuit 103, it is enabled, and of course, heating circuit 101 is opened or disabled. Of course, the set-point temperature of thermostat 3 selected by operator operation of cam 75 thereof, as described hereinbefore, will cause bimetal strip 43 to move its armature 87 so as to drive magnetically operated switch 99 toward making engagement with a cooling contact 135 thereof. With magnetically operated switch 99 made with its cooling contact and switch 49 enabling cooling circuit 103, power may flow from thermostat terminal 133 through contact bar 105 made between contacts 117, 119. Therefrom, the power flows to cooling contact 135 and through magnetically operated switch 99 made therewith to interconnected thermostat terminals 129, 131. Another anticipator 137 may be connected in cooling circuit 103 across magnetically operated switch 99 and its cooling contact for energization upon completion of the cooling circuit to effect preheating of bimetal strip 43 much in the same manner of the preheating thereof by anticipator 1, as previously described, if desired.

If desired, thermostat 3 may also include a fan operating circuit, indicated generally at 139. Switch 51 is included in fan operating circuit 139 having a contact bar 141 manually movable between making engagement with switch contacts 143, 145 in an automatic operating mode and between switch contacts 145, 147 in an "on" operating mode. When switch 49 is set to enable power circuit 103, as previously described, and contact bar 141 made with contacts 143, 145 of switch 51 to effect the automatic operating mode thereof, power may flow from thermostat terminal 133 through contact bar 107 and contacts 121, 123 of switch 49 and therefrom through contact bar 141 and contacts 143, 145 of fan switch 51 to another thermostat terminal 149. When contact bar 141 of fan switch 51 is manually moved to make with contacts 145, 147, the "on" operating mode of switch 51 is effected. Power may then flow from thermostat interconnected terminals 129, 131 through contact bar 141 and contacts 145, 147 of fan switch 51 to thermostat terminal 149. Of course, other components in a heating and cooling system 151, briefly discussed below, which is adapted to be controlled by thermostat 3 are operable to effect the power flow when fan switch 51 is in its automatic operating mode.

As shown generally in FIG. 8, a transformer 153 has its primary side connected across power terminals L1, L2, and the secondary side of the transformer is connected in series circuit relation between thermostat terminal 131 and a common terminal 155. A gas valve or heating relay 157 is connected in series circuit relation with a safety pilot or temperature limit switch 159 and a high temperature limit switch 161 between thermostat terminal 127 and common terminal 155. A fan operating relay 163 is connected in series circuit relation between thermostat terminal 149 and common terminal 155. To complete the description of heating and cooling system 151, a compressor motor contactor 165 is connected in series circuit relation with a high pressure cut-out 167 on a compressor (not shown) for the heating and cooling system between thermostat terminal 133 and common terminal 155. The heating and cooling system 151 set out herein is not a part of this invention and is so well known in the art that a description of its operation is believed to be superfluous and therefore is omitted for the sake of brevity.

Figure 9:
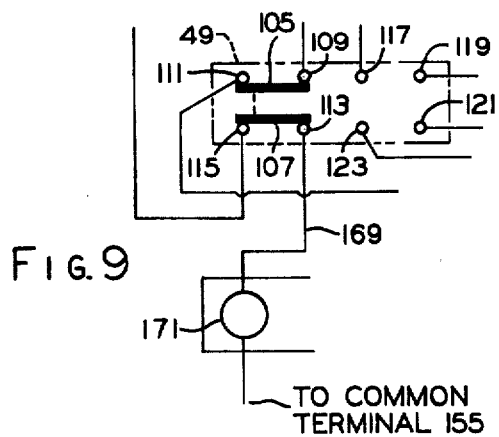
FIG. 9 is a schematic diagram of alternative circuitry in one form of the invention for the thermostat of FIG. 4.

In FIG. 9, there is shown an alternative connection for thermostat 3 in one form of the invention wherein contacts 113, 123 of switch 49 are electrically isolated from each other, and a lead 169 is connected between contact 113 and a thermostat terminal 171. In this arrangement, thermostat terminal 171 would be connected to common terminal 155 in heating and cooling system 151. In this manner, when switch 49 is positioned to enable heating circuit 101, as previously described, power would flow from thermostat terminal 171 through contact bar 107 and contacts 113, 115 to effect the energization of PTCR 7 as previously described. In this manner, PTCR is energized directly from transformer 153 through common terminal 155, i.e. from a power source other than heating circuit 101.

In view of the foregoing, it is now apparent that a novel anticipator 1, a novel method of making means operable generally for maintaining a desired cycle rate with acceptable droop in a thermostat, a novel method of operating an anticipator, a novel thermostat 3, a novel method of making a thermostat, and a novel method of operating a thermostat are provided meeting the objects and advantageous features set out hereinbefore, as well as others. It is contemplated that changes in the precise connections, configurations, shapes and details of the structures and changes in the steps of the methods which are preseated merely to illustrate the invention may be made by those having ordinary skill in the art without departing from the spirit of the invention and the scope thereof as set out by the claims which follow.

What I claim as new and desire to secure by Letters Patent in the United States is:

1. An anticipator for controlling the cycle rate and the droop of a temperature responsive member utilized in a thermostat, the anticipator comprising means for transferring heat supplied thereto to the temperature responsive member of the thermostat, said heat transferring means including a chamber therewithin and generally isolated from ambient atmosphere to which said heat transferring means is subjected, and means enclosed within said chamber of said heat transferring means and predeterminately spaced from engagement with said heat transferring means for supplying the heat thereto.

2. An anticipator as set forth in claim 1 wherein said heat supplying means comprises a thermistor disposed in the chamber primarily in convective heat transfer relation with said heat transferring means.

3. An anticipator as set forth in claim 1 wherein said heat supplying means comprises means operable generally in response to voltage applied thereto to vary its resistance as a function of its temperature for generating the supplied heat.

4. An anticipator as set forth in claim 1 wherein the heat supplying means is a PTCR.

5. An anticipator as set forth in claim 1 further comprising means for mounting said heat supplying means within said chamber so as to effect the predetermined spacing of said heat supplying means from engagement with said heat transferring means.

6. An anticipator as set forth in claim 5 wherein said mounting means comprises means for applying a voltage to said heat supplying means and generally comprising its sole support within said chamber of said heat transferring means.

7. An anticipator as set forth in claim 6 wherein said voltage applying means includes means adapted to be supported in electrical insulating relation on said heat transferring means.

8. An anticipator as set forth in claim 6 wherein said voltage applying means comprises an electrical lead having a portion interiorly of said chamber disposed in supporting engagement with said heat supplying means and having at least another portion exteriorly of said chamber in mounting engagement with said heat transferring means.

9. An anticipator as set forth in claim 1 further comprising means extending through a portion of said heat transferring means into said chamber so as to be electrically insulated from the heat transferring means for applying a voltage to said heat supplying means.

10. An anticipator as set forth in claim 9 wherein said voltage applying means includes means for mounting engagement with said portion of said heat transferring means and said heat supplying means so as to suspend said heat supplying means within said chamber of said heat transferring means in the predetermined spacing from engagement therewith.

11. An anticipator as set forth in claim 1 wherein said heat transferring means includes a housing, said chamber being defined in said housing so that said housing encloses said heat supplying means to effect the general isolation thereof from the ambient atmosphere exteriorly of said housing to which said heat transferring means may be subjected.

12. An anticipator as set forth in claim 11 wherein said housing comprises at least in part a metal portion having good heat transfer characteristics.

13. An anticipator as set forth in claim 12 wherein said metal portion of said housing includes a recess part so as to enhance the heat transfer by said heat transferring means and defining at least a part of said chamber within said heat transferring means.

14. An anticipator as set forth in claim 12, wherein said housing further comprises means for connection in displacement preventing engagement with said metal portion and having good electrical and heat insulating characteristics, said metal portion and said connection means defining said chamber within said heat transferring means.

15. An anticipator as set forth in claim 14, further comprising means associated with said connection means for suspending said heat supplying means within said chamber in the predetermined spaced relation with at least said metal portion of said housing.

16. An anticipator as set forth in claim 15 wherein said heat supplying means is operable generally to vary its resistance as a function of its temperature in response to voltage applied thereto, and said suspending means comprising means for applying voltage to said heat supplying means.

17. An anticipator as set forth in claim 1 wherein said heat supplying means comprises means for generating the supplied heat at a generally constant rate.

18. An anticipator operable generally for controlling at least the cycle rate of a thermostat comprising a housing, said housing including a metallic member having good heat transfer characteristics, means on said housing adapted for connection in conductive heat transfer relation with a temperature sensing component of the thermostat, a recess portion in said metallic member, an insulating member having both good electrical and heat insulating characteristics and secured to said metallic member generally opposite said recess portion therein, and a chamber in said housing between said metallic member and said insulating member thereon and generally isolated from the ambient atmosphere exteriorly of said housing, means within said chamber extending at least in part into said recess portion and disposed primarily in convective heat transfer relation with said metallic member for supplying heat thereto, an electrical lead connected with said heat supplying means to effect energization thereof so as to generate the supplied heat and said electrical lead mounting said heat supplying means within said chamber generally in spaced relation with both said metallic member and said insulating member, and means in said insulating member for the passage of said electrical lead into said chamber.

19. A thermostat adapted for controlling the temperature in a space in which it may be located comprising means for sensing the temperature of the space, and an anticipator for said thermostat operable generally to attain a preselected cycle rate with acceptable droop for said thermostat including means for transferring heat supplied thereto to said temperature sensing means, a chamber within said heat transferring means and generally isolated from the ambient atmosphere of the space to which said anticipator is subjected, and means adapted to be energized for supplying the heat to said heat transferring means and enclosed within said chamber in heat transfer relation with said heat transferring means.

20. A thermostat as set forth in claim 19 further comprising means for suspending said heat supplying means in said chamber so that the heat transfer relation between said heat supplying means and said heat transferring means is primarily convective.

21. A thermostat as set forth in claim 19, wherein heat transferring means includes means for coupling said heat transferring means in heat conductive relation with said temperature sensing means.

22. A thermostat as set forth in claim 19 further comprising means extending through said heat transferring means into said chamber for effecting the energization of said heat supplying means and for mounting it within the chamber in predetermined spaced relation with said heat transferring means.

23. A thermostat as set forth in claim 19 wherein said heat transferring means comprises a housing generally enclosing the heat supplying means, said chamber being defined within said housing, and at least a portion of said housing including a metal having good heat transfer characteristics.

24. A thermostat as set forth in claim 23 wherein said metal portion includes means for coupling said heat transferring means in heat conductive relation to said temperature sensing means.

25. A thermostat as set forth in claim 23, wherein said housing further includes means for engagement with said metal portion to enclose said heat supplying means and having both good electrical and heat insulating charateristics.

26. A thermostat as set forth in claim 25 further comprising means associated with said engagement means for mounting said heat supplying means within said chamber in the predetermined spaced relation with at least said metal portion.

27. A thermostat as set forth in claim 26 wherein said mounting means comprises means for effecting the energization of said heat supplying means.

28. A thermostat as set forth in claim 19 wherein said heat supplying means comprises means operable generally in response to a voltage applied thereto to vary its resistance as a function of its temperature for generating the suplied heat.

29. A thermostat as set forth in claim 19 wherein said heat supplying means is a PTCR.

30. A thermostat as set forth in claim 19 wherein said temperature sensing means is a bimetal element, said heat transferring means being conductively coupled with said bimetal element at a predetermined location thereon so as to attain the preselected cycle rate for said thermostat.

31. A thermostat as set forth in claim 19 wherein said heat supplying means comprises means operable generally at a temperature appreciably greater than that of the space so as to be generally unaffected by changes in the space temperature within a predetermined range thereof.

32. In a thermostat having means for sensing the temperature of a space in which the thermostat may be located, means operable generally in different temperature settings through a preselected temperature range for preselecting a temperature of the space, means coupled with the temperature sensing means for transferring heat thereto to maintain a preselected cycle rate with acceptable droop for the thermostat; the improvement wherein the heat transferring means comprises means enclosed within said heat transferring means so as to be generally isolated from the ambient atmosphere of the space and operable generally as a constant temperature heat source when energized for supplying the heat to said heat transferring means in response to the temperature setting of said temperature preselecting means in the preselected temperature range thereof.

33. In a thermostat having means for sensing temperature of a space in which the thermostat may be located, means selectively operable through a predetermined range of temperature settings for controllably effecting a preselected temperature in the space, means operable generally as an anticipator for maintaining a preselected cycle rate with acceptable droop for the thermostat and having means coupled with the temperature sensing means for transferring heat thereto; the improvement wherein the maintaining means comprises means enclosed within said heat transferring means so as to be generally isolated from the ambient atmosphere of the space and adapted to be energized for generating the heat and supplying it to said heat transferring means at a temperature appreciably in excess of the preselected temperature in the space wherein operation of effecting means through its predetermined range of temperature settings results only in a generally small amount of change in the heat supplied by said heat generating means.

34. A method of making means operable generally for maintaining a preselected cycle rate with acceptable droop in a thermostat comprising the steps of:
  a. mounting means adapted to be energized for generating heat to means for supporting it; and
  b. attaching the supporting means to means for transmitting the heat and enclosing the heat generating means within a chamber generally isolated from the ambient atmosphere to which the maintaining means may be subjected and formed between the supporting means and the heat transmitting means to that the heat generating means is disposed in predetermined spaced relation with the heat transferring means.

35. The method as set forth in claim 34, comprising the preliminary step of mechanically securing the heat generating means to means for energizing it.

36. The method as set forth in claim 35 wherein the mounting step comprises inserting the energizing means through means in the supporting means for the passage therethrough of the energizing means.

37. The method as set forth in claim 36 wherein the mounting step further comprises positioning the energizing means generally in fixed relation to the supporting means.

38. The method as set forth in claim 34 comprising the preliminary step of forming means on the heat transmitting means for coupling it in heat conductive relation to a temperature sensing component of the thermostat.

39. The method as set forth in claim 34 wherein the heat generating means is a PTCR.

40. The method as set forth in claim 34, wherein the heat transferring means includes a metallic portion having good thermal transfer properties, the heat generating means being disposed in the predetermined spaced relation with the metallic portion.

41. The method as set forth in claim 34 wherein the supporting means comprises an insulating portion having good electrical and heat insulating properties.

42. The method as set forth in claim 34 comprising the preliminary step of forming in the heat transferring means a generally recessed portion into which at least a portion of the heat generating means is adapted to be disposed during the attaching step.

43. The method as set forth in claim 34 wherein the mounting step includes predeterminately spacing the heat generating means from the supporting means.

44. A method of making a thermostat having means for sensing temperature of a space in which the thermostat may be located and means operable generally as an anticipator in the thermostat for maintaining a preselected cycle rate thereof with acceptable droop comprising the steps of:
  a. mounting means adapted to be energized for generating heat to one of a pair of housing portions of the anticipator and enclosing the heat generating means within a chamber formed between the housing portions so as to be generally isolated from the ambient atmosphere of the space; and
  b. coupling the other of the housing portions in thermal conductive relation with the temperature sensing means.

45. The method as set forth in claim 44 wherein the temperature sensing means is a bimetal element, and wherein the coupling step includes predeterminately locating the other housing portion on the bimetal element for attaining the preselected cycle rate for the thermostat.

46. The method as set forth in claim 44 comprising the preliminary step of connecting the heat generating means to means for effecting the energizing thereof with the energizing effecting means being associated with the one housing portion during the mounting and enclosing step.

47. The method as set forth in claim 46 wherein the mounting and enclosing step comprises inserting the energizing effecting means through means provided in the one housing portion for the passage of the energizing effecting means therethrough so that the heat generating means may be predeterminately spaced from the at least one of the one housing portion and the other housing portion.

48. The method as set forth in claim 46, wherein the mounting and enclosing step further comprises securing at least a portion of the energizing effecting means to at least a part of the one housing portion exteriorly of the chamber.

49. The method as set forth in claim 46 comprising the additional step of electrically connecting the energizing effecting means in circuit relation with the temperature sensing means.

50. The method as set forth in claim 44 wherein the coupling step comprises disposing at least a part of the other housing portion in heat conductive relation with the temperature sensing means.

51. The method as set forth in claim 44 wherein the other housing portion comprises a metallic member having good heat transfer properties.

52. The method as set forth in claim 44 wherein the one housing portion comprises an insulating member having good electrical and heat insulating properties.

53. The method as set forth in claim 44 wherein the heat generating means is a PTCR.

54. The method as set forth in claim 46 comprising the preliminary step of providing means in the one housing portion for passage therethrough of the energizing effecting means during the and enclosing step.

55. A method of operating a thermostat having means for sensing temperature of a space in which the thermostat may be located comprising the steps of:
  a. energizing means operable generally for generating heat;

b. transferring the heat at least in the most part by convection to means for enclosing the heat generating means so as to generally isolate it from the ambient atmosphere of the space; and c. transmitting the heat at least for the most part by conduction from the enclosing means to the temperature sensing means for effecting a preselected cycle rate thereof in the thermostat with acceptable droop.

56. A method of operating a thermostat having means for sensing temperature of a space in which the thermostat may be located and means operable generally between a plurality of settings for selecting a desired temperature for the space within a predetermined temperature range comprising the steps of:

a. energizing means for generating heat in an amount which changes only within a generally small predetermined range in response to the operation of the selecting means through its predetermined temperature range and with the heat generating means being enclosed within means for enclosing it so as to generally isolate the heat generating means from the ambient atmosphere of the space; and b. transmitting the heat to the temperature sensing means for maintaining a preselected cycle rate thereof in the thermostat with acceptable droop.

57. A thermostat as set forth in claim 51 further comprising other means connected in the cooling circuit and energized upon the enabling thereof for also supplying heat to the controlling means to maintain the selected cycle rate thereof.

58. The method as set forth in claim 56 wherein the transmitting step includes transferring the heat primarily by convection from the heat generating means to the encasing and then primarily by conduction from the encasing means to the temperature sensing means.

59. The method as set forth in claim 56, wherein the energizing step includes operating the heat generating means generally at temperatures appreciably in excess of the temperature setting of the selecting means.

60. A method of operating an anticipator for a thermostat comprising the steps of:

a. energizing means for generating heat for the anticipator to an operating temperature appreciably in excess of that of the ambient atmosphere in which the anticipator may be located with the heat generating means being generally isolated within means for encasing it from the ambient atmosphere; and b. transferring the heat from the heat generating means to the encasing means a generally constant rate.

61. The method as set forth in claim 60, wherein the transferring step comprises transmitting the heat from the heat generating means to the encasing means primarily by convection.

62. The method as set forth in claim 60 wherein the heat generating means is predeterminately spaced from the encasing means so that the heat is transferred in the most part by convection during the transmitting step.

63. A thermostat comprising an electrical circuit, means selectively operable for enabling said circuit, means movable in response to a sensed temperature for controlling the completion and the interruption, respectively, of said circuit when it is enabled, and means isolated generally from the ambient atmosphere to which the thermostat may be subjected and adapted to be energized from a power source other than said circuit for supplying heat to said controlling means to maintain a selected cycle rate thereof with acceptable droop in the thermostat upon the enabling of said circuit.

64. A thermostat comprising a heating circuit and a cooling circuit, means selectively operable for enabling one of the heating circuit and the cooling circuit, means movable in response to a sensed temperature for controlling the completion and the interruption, respectively, of the enabled one of the heating circuit and the cooling circuit, and means connected in the cooling circuit and energized upon the enabling of the heating circuit for supplying heat to the controlling means to maintain a selected cycle rate thereof with acceptable droop in the thermostat.

65. An anticipator for use in thermostat, the anticipator comprising a housing having a metallic member and another member interconnected against displacement from each other, a chamber within said metallic member and said another member and generally isolated from ambient atmosphere exteriorly of said housing, means within said chamber adapted to be energized for generating heat so that the heat is transferred to said metallic portion, said means electrically connected with said heat generating means and extending into said chamber from said another member for both energizing said heating means and suspending it within said chamber.

66. A method of making an anticipator for use in a thermostat with the anticipator having means adapted to be energized for generating heat, means electrically associated with the heat generating means for energizing it, a housing including a metallic member having a recessed portion therein, an insulating member having generally opposite faces, and means extending through the insulating member between the opposite faces for receiving the generating means, the method comprising the steps of:

a. inserting the energizing means through the passage means so as to mount the heat generating means to the insulating member adjacent one of the opposite faces thereof;

b. positioning the heat generating means mounted to the insulating member within the recessed portion of the metallic member in predetermined spaced relation therewith;

c. securing the insulating member and the metallic member together so that the recessed portion of the metallic member with the heat generating means disposed therein is generally isolated from the ambient atmosphere exteriorly of the housing.

67. The method as set forth in claim 66 wherein the inserting step includes associating the energizing means with the other of the opposite faces of the insulating member so as to generally maintain the energizing means against displacement movement in the passage means.

68. The method as set forth in claim 66 wherein the inserting step includes positioning the heat generating means in predetermined spaced relation adjacent the one opposite face of the insulating member.

69. A method of making an anticipator for use in a thermostat with the anticipator having a housing including a metallic member and another member, the method comprising the steps of:

a. mounting means for generating heat with the another member and suspending the heat generating means within a recess therefor in the metallic member so that the heat generating means is predeterminately spaced away from engagement with the metallic member and in heat transferring relation therewith; and b. interconnecting the metallic member and the another member so that the recess of the metallic member with the heat generating means therein is generally isolated from the ambient atmosphere exteriorly of the housing.

70. An anticipator for use in a thermostat comprising a housing, at least a part of said housing having good heat transfer characteristics, a chamber in said housing and generally isolated from the atmosphere exteriorly of said housing, means enclosed generally within said chamber in heat transfer relation with said at least part of said housing and adapted to be energized for generating heat, and means associated with said housing for both energizing said heat generating means and positioning it within said chamber.

* * * * *